US012066177B2

(12) United States Patent
Yang et al.

(10) Patent No.: US 12,066,177 B2
(45) Date of Patent: *Aug. 20, 2024

(54) THERMALLY MANAGED HAZARDOUS LOCATION LED LIGHT FIXTURE, ASSEMBLY AND METHODS WITHOUT UTILIZING HEAT SINKS

(71) Applicant: EATON INTELLIGENT POWER LIMITED, Dublin (IE)

(72) Inventors: Yang Yang, Shanghai (CN); Srinath K. Aanegola, Bengaluru (IN); Peihuan Liu, Shanghai (CN)

(73) Assignee: Eaton Intelligent Power Limited, Dublin (IE)

( * ) Notice: Subject to any disclaimer, the term of this patent is extended or adjusted under 35 U.S.C. 154(b) by 0 days.

This patent is subject to a terminal disclaimer.

(21) Appl. No.: 18/186,893

(22) Filed: Mar. 20, 2023

(65) Prior Publication Data

US 2023/0341120 A1 Oct. 26, 2023

Related U.S. Application Data

(63) Continuation of application No. 17/136,961, filed on Dec. 29, 2020, now Pat. No. 11,608,975.

(30) Foreign Application Priority Data

Dec. 31, 2019 (CN) .......................... 201911141469.3

(51) Int. Cl.
*F21V 31/04* (2006.01)
*F21V 3/06* (2018.01)
(Continued)

(52) U.S. Cl.
CPC .............. *F21V 31/04* (2013.01); *F21V 3/062* (2018.02); *F21V 15/01* (2013.01); *F21V 23/003* (2013.01); *F21V 23/009* (2013.01); *F21V 23/02* (2013.01); *F21V 25/12* (2013.01); *F21V 29/10* (2015.01); *F21V 29/503* (2015.01); *F21V 29/508* (2015.01); *F21V 31/005* (2013.01);
(Continued)

(58) Field of Classification Search
CPC ........ F21V 31/04; F21V 15/01; F21V 23/003; F21V 23/02
See application file for complete search history.

(56) References Cited

U.S. PATENT DOCUMENTS 8,616,730 B2 * 12/2013 Edwards, Jr. ........... F21S 8/043
362/225
9,625,129 B2 * 4/2017 Jiang ..................... F21V 19/009
(Continued)

*Primary Examiner* — William N Harris
(74) *Attorney, Agent, or Firm* — Baker Botts L.L.P.

(57) ABSTRACT

An LED light fixture for a hazardous location includes an axially elongated enclosure fabricated from a polymer material, at least one axially elongated linear light emitting diode (LED) module mounted in the enclosure, and an LED driver module mounted in the housing that operates the at least one linear light emitting diode. A combination of a cover lens material of the cover lens and the polymer material of the axially elongated enclosure assists with heat dissipation from the light fixture, thereby allowing the LED driver module and the at least one axially elongated linear printed circuit board with LED components to operate within a target peak temperature limit for the hazardous location.

20 Claims, 17 Drawing Sheets

(51) Int. Cl.

| | |
|---|---|
| ***F21V 15/01*** | (2006.01) |
| ***F21V 23/00*** | (2015.01) |
| ***F21V 23/02*** | (2006.01) |
| ***F21V 25/12*** | (2006.01) |
| ***F21V 29/10*** | (2015.01) |
| ***F21V 29/503*** | (2015.01) |
| ***F21V 29/508*** | (2015.01) |
| ***F21V 31/00*** | (2006.01) |
| ***F21Y 103/10*** | (2016.01) |
| ***F21Y 115/10*** | (2016.01) |
| ***H05B 45/56*** | (2020.01) |

(52) U.S. Cl.
CPC .......... *H05B 45/56* (2020.01); *F21Y 2103/10* (2016.08); *F21Y 2115/10* (2016.08)

(56) References Cited

U.S. PATENT DOCUMENTS

| | | | | |
|---|---|---|---|---|
| 2012/0217883 | A1* | 8/2012 | Cho | H05B 45/48<br>362/311.01 |
| 2017/0336055 | A1* | 11/2017 | Rinko | F21V 31/04 |
| 2019/0101275 | A1* | 4/2019 | Lin | F21V 29/10 |
| 2020/0400288 | A1* | 12/2020 | Zhang | F21V 17/18 |

* cited by examiner

THERMALLY MANAGED HAZARDOUS LOCATION LED LIGHT FIXTURE, ASSEMBLY AND METHODS WITHOUT UTILIZING HEAT SINKS

CROSS REFERENCE TO RELATED APPLICATIONS

This application is a continuation under 35 U.S.C. § 120 of U.S. patent application Ser. No. 17/136,961, filed 29 Dec. 2020, which claims priority to Chinese Application No. 201911411469.3 filed Dec. 31, 2019, the entire disclosure of which is hereby incorporated by reference in its entirety.

BACKGROUND OF THE INVENTION

The field of the invention relates generally to lighting fixtures, and more specifically to LED lighting fixtures including temperature management features for use in hazardous locations.

To address the shortcomings of incandescent bulbs in traditional lighting figures, more energy-efficient and longer lasting sources of illumination in the form of light emitting diodes (LEDs) are highly desired. This includes, but is not limited to lighting fixtures that are specially designed for use in hazardous environments that require a specific focus on heat management in the operation of the lighting fixtures. Such lighting fixtures may include many high output LEDs operating in combination, and can produce excessively high temperatures for hazardous location usage. In a hazardous location, the peak operating temperature of the lighting fixture must be managed so as to not to exceed a predetermined temperature limit that could cause the light fixture to be a source of ignition of combustible elements in the ambient environment. Also, heating effects may contribute to dimming of the LED lighting over time, as well as reliability issues and possible premature failure of LED lighting fixtures.

Conventional high-output LED lighting fixtures for hazardous location use include direct thermal couplings to heat sink devices, such as aluminum heat sinks, in order to reduce peak operating temperature of the lighting fixture in use and to improve its life expectancy. Such heat sinks, however, tend to complicate the lighting fixture assembly at an undesirable economic cost.

Improved, lower cost LED lighting fixtures that effectively dissipate heat for use in hazardous locations are accordingly desired.

BRIEF DESCRIPTION OF THE DRAWINGS

Non-limiting and non-exhaustive embodiments are described with reference to the following Figures, wherein like reference numerals refer to like parts throughout the various drawings unless otherwise specified.

DETAILED DESCRIPTION OF THE INVENTION

Figure 1:
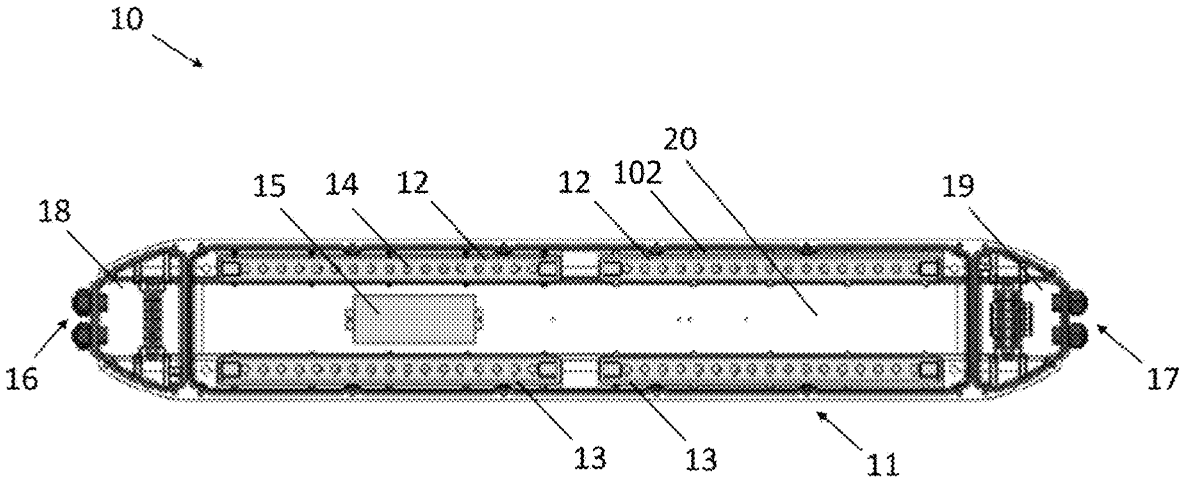
FIG. 1 is a partial top view of an exemplary hazardous location LED light fixture assembly.
Figure 2:
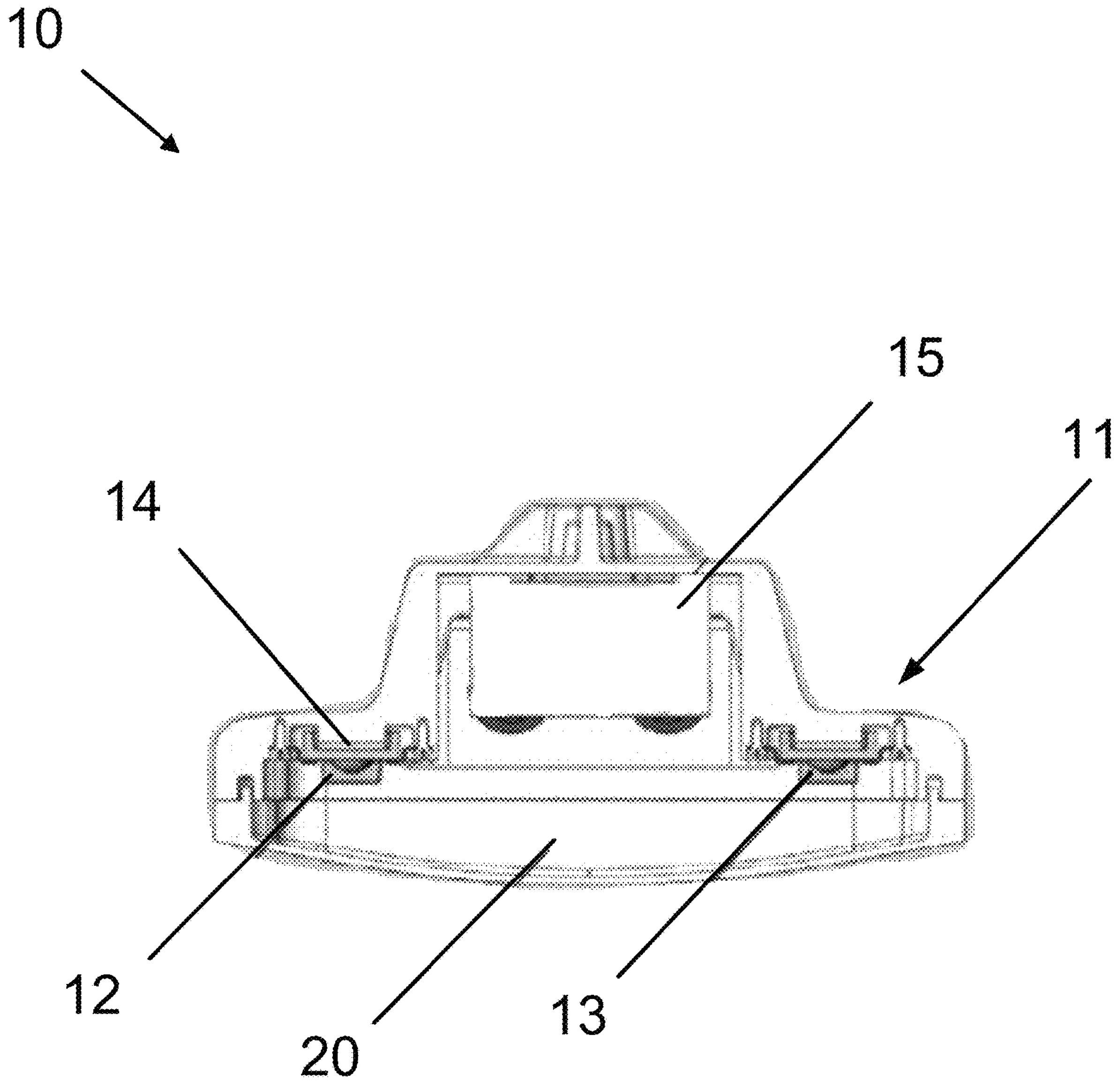
FIG. 2 is a sectional view of the hazardous location LED light fixture assembly shown in FIG. 1.

In order to understand the inventive concepts described herein to their fullest extent, some discussion of the state of the art and certain problems and disadvantages concerning LED light fixtures is set forth below, followed by exemplary embodiments of linear LED light fixtures overcoming such problems and disadvantages in the art.

Various types of lighting fixtures utilizing LEDs have been developed for numerous types of commercial and industrial environments. More specifically, LED light fixtures have been developed for lighting tasks in harsh and hazardous environments, such as being designed to be explosion-protected. Such lighting fixtures are constructed to be shock-resistant and vibration resistant with no filament or glass to break, for immediate start with instant full illumination, no lifetime reduction due to switching cycles, and reduced disposal costs. Dealing with heat dissipation requirements or thermal management is a problem area for LED light fixtures. Heat dissipation is difficult in part because high luminance LED light fixtures typically have numerous LEDs operating at once in relatively small spacing from one another. Complex structures for LED module mounting and heat dissipation have, in many instances, been deemed necessary, and all of this adds complexity and cost to the fixtures.

Further, some known LED fixtures use heat sinks that are integrated into the fixture and engineered to provide a path for heat to travel and remove heat from the fixture to ensure a longer life, better lumen output and accurate color temperature. Many of these typical LED lighting fixtures in hazardous environments are high-luminance light fixtures and generate a large amount of heat in use. Dissipating heat for LED light fixtures is typically accomplished with heat sinks made of aluminum, and such heat sinks are integrated into the fixture typically equally adjacent from both LED modules and LED drivers to dissipate heat for all components. These aluminum heat sinks are costly for manufacturing the LED lighting fixtures. Typically these heat sinks are stacked in the fixture between the LED modules and the LED driver.

In lighting fixtures which operate within hazardous environments presenting a risk of explosion via ignition of a surrounding gas or vapor dusts, fibers, or flyings, temperature management of the lighting fixtures in use is a primary concern. Such hazardous environments may arise in, for example only, petroleum refineries, petrochemical plants, grain silos, wastewater and/or treatment facilities, among other industrial facilities in which sustained or volatile conditions in the ambient environment may be present and may present a heightened risk of fire or explosion. An occasional or continuous presence of airborne ignitable gas, ignitable vapors or ignitable dust, or otherwise flammable substances presents substantial concerns regarding safe and reliable operation of such facilities overall, including, but not limited to, safe operation of the lighting fixtures within predetermined temperature limits that, if exceeded, could produce ignition sources for possible fire or explosion. As such, a number of standards have been promulgated relating to electrical product use in hazardous environments to improve safety in hazardous locations in view of an assessed probability of explosion or fire risk.

For example, Underwriter's Laboratories ("UL") standard UL1203 sets forth Explosion-Proof and Dust-Ignition-Proof Electrical Equipment criteria for hazardous locations. Electrical equipment manufacturers may receive UL certification of compliance with the applicable rating standards for hazardous locations, and UL certification is an important aspect of a manufacturer's ability to successfully bring products to market in North America or any other market accepting of standard UL1203.

The National Electric Code (NEC) Article 500 sets forth a hazardous location coding system, and the NEC generally classifies hazardous locations by class and division. Class I locations are those locations in which flammable vapors and gases may be present. Class II locations are those in which combustible dust may be found. Class III locations are those locations which are hazardous because of the presence of easily ignitable fibers or flyings. Class I, Division 1 covers locations where flammable gases or vapors may exist under normal operating conditions, under frequent repair or maintenance operations, or where breakdown or faulty operation of process equipment might also cause simultaneous failure of electrical equipment. Class I, Division 2 covers locations where flammable gases, vapors or volatile liquids are handled either in a closed system, or confined within suitable enclosures, or where hazardous concentrations are normally prevented by positive mechanical ventilation. Areas adjacent to Division 1 locations, into which gases might occasionally flow, would also be Division 2. Similar divisions are defined in the NEC for the remaining classes.

The International Electrotechnical Commission (IEC) likewise categorizes hazardous locations into Zone 0, 1, or 2 representing locations in which flammable gases or vapors are or may be airborne in an amount sufficient to produce explosive or ignitable mixtures. As defined in the IEC, a Zone 0 location is a location in which ignitable concentrations of flammable gases or vapors are likely to exist under normal operating conditions; or in which ignitable concentrations of flammable gases or vapors may exist frequently because of repair or maintenance operations or because of leakage; or in which equipment is operated or processes are carried on, of such a nature that equipment breakdown or faulty operations could result in the release of ignitable concentrations of flammable gases or vapors and also cause simultaneous failure of electrical equipment in a mode to cause the electrical equipment to become a source of ignition; or that is adjacent to a Zone 1 location from which ignitable concentrations of vapors could be communicated.

While expressed a bit differently, IEC Zone 1 and NEC Division 2, in practice, generally converge to common locations in the assessment of hazardous environments. In view of modern environmental regulation and the concentrated nature of Division 1 and Zone 0 applications, any lighting fixtures installed in such hazardous locations must reliably operate at a safe temperature with respect to the surrounding atmosphere. As such, conventional LED lighting fixtures for hazardous locations include more extensive heat sink features for dissipating heat than other types of lighting fixtures, and the heat sinks may considerably complicate the lighting fixture assembly and also render the cost of hazardous location LED lighting fixtures undesirably high.

In addition to hazardous locations discussed above, so-called harsh locations also require specific focus in the design of light fixtures used therewith. Harsh locations may entail corrosive elements and the like in the atmosphere that are not necessarily explosive and/or are subject to temperature cycling, pressure cycling, shock and/or mechanical vibration forces that are typically not present in non-harsh operating environments. Of course, some locations in which LED lighting fixtures are desirably employed are both harsh and hazardous by nature, and are therefore heavy duty fixtures designed to withstand various operating conditions that more typical lighting features for other uses could not withstand.

Simpler and more cost effective linear LED lighting fixtures for harsh and hazardous environments which are simpler and cheaper to manufacture are therefore desired that may more flexibly meet the needs of different installations.

Exemplary embodiments of LED lighting fixtures for harsh and hazardous locations are described below that advantageously simplify assembly of the fixture by avoiding the costs and complications of heat sinks in the design of the fixture. The LED fixtures are designed in such a way that LED modules, an LED driver, and removable terminal covers all dissipate heat generated effectively enough to maintain thermal stability of the fixture and maintain the effective surface temperature of the fixture below a maximum allowable temperature threshold or limit for the harsh and/or hazardous location in which it is installed.

In contemplated embodiments, inventive harsh and hazardous location LED lighting fixtures include an assembly with dual LED modules spaced apart and extending parallel to one another, and an LED driver elevated relative to the dual LED modules. Compared to known linear LED light fixtures for harsh and hazardous location use where a single LED module is assembled directly above a heat sink and an LED driver is located beneath the heat sink in a stacked configuration, the inventive LED light fixture assembly is much less complicated and may be manufactured at reduced cost.

The improved LED light fixture may include an axially elongated enclosure, multiple axially elongated LED modules having lights arranged along a linear axis, an LED driver, multiple sets of terminals, terminal covers, and a lens. Thermal testing of the assembly of elements in the improved LED light fixture has been demonstrated to show the effectiveness of dissipating heat to manage operating temperatures below applicable temperature limits of the harsh and hazardous location without requiring heat sinks in the assembly.

While described below in reference to particular embodiments and arrangements of LED light fixture assemblies including heavy duty materials meeting the requirements for specific types of harsh and hazardous location use, such description is intended for the sake of illustration rather than limitation. The significant benefits of the inventive concepts will now be explained in reference to the exemplary embodiments illustrated in the Figures. Method aspects will be in part explicitly discussed and in part apparent from the following description.

Figure 3:
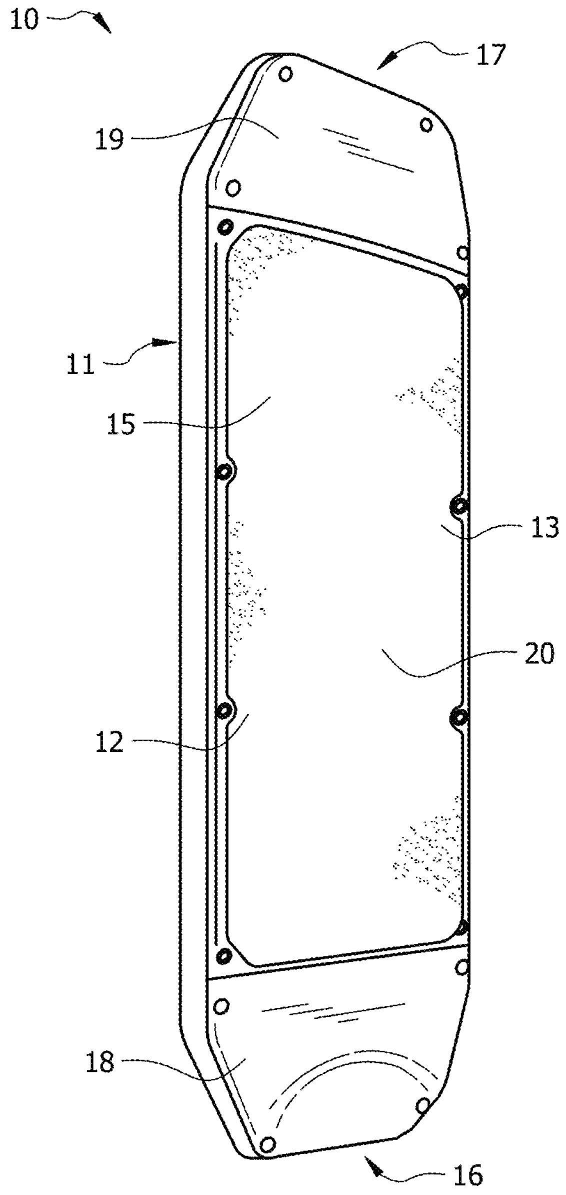
FIG. 3 is a bottom view of the hazardous location LED light fixture assembly shown in FIG. 1.
Figure 4:
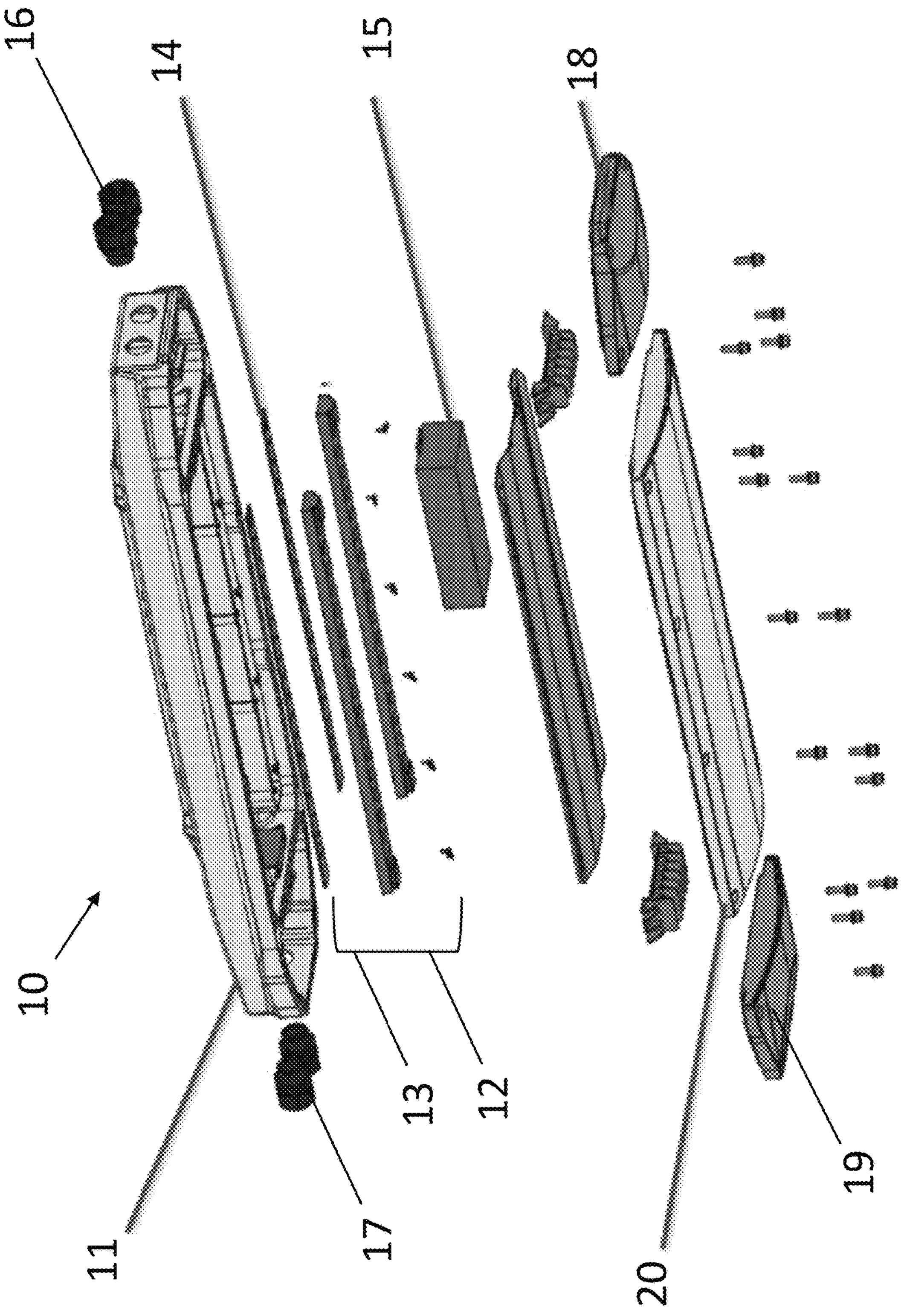
FIG. 4 is an exploded view of the hazardous location LED light fixture assembly shown in FIGS. 1 through 3.
Figure 5A:
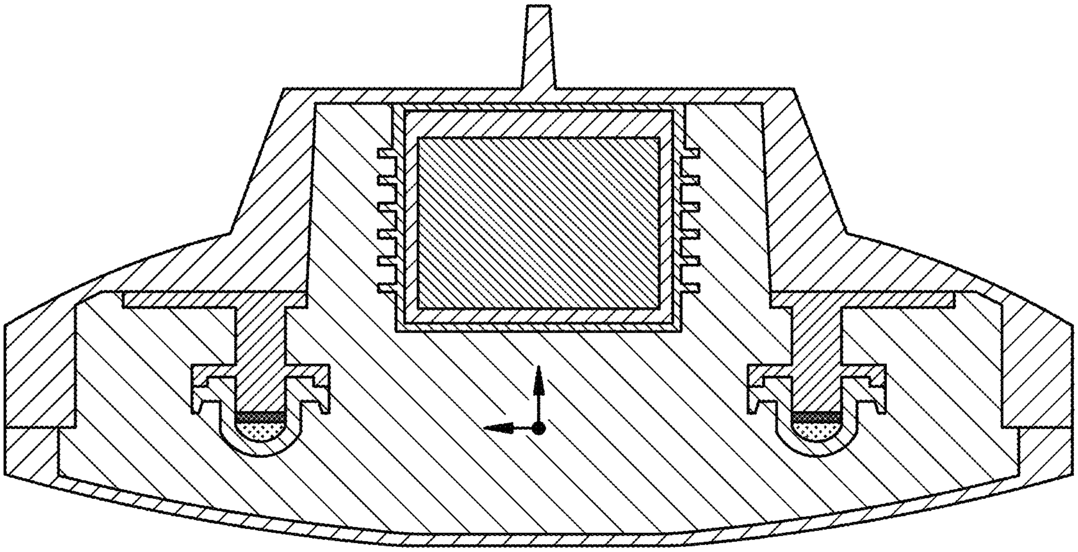
FIG. 5A is a simulated sectional view of the hazardous location LED light fixture assembly shown in FIGS. 1-4.
Figure 5C:
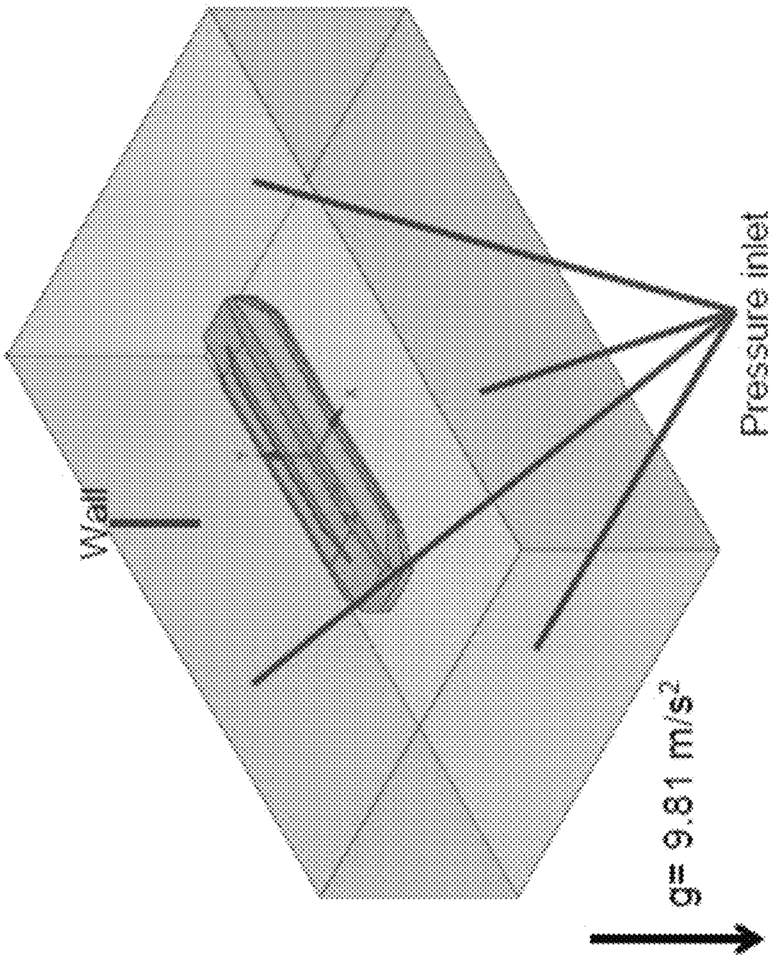
FIG. 5C is a simulated perspective view of the hazardous location LED light fixture assembly shown in FIGS. 5A and 5B installed in a hazardous location and being subjected to heating effects.
Figure 5B:
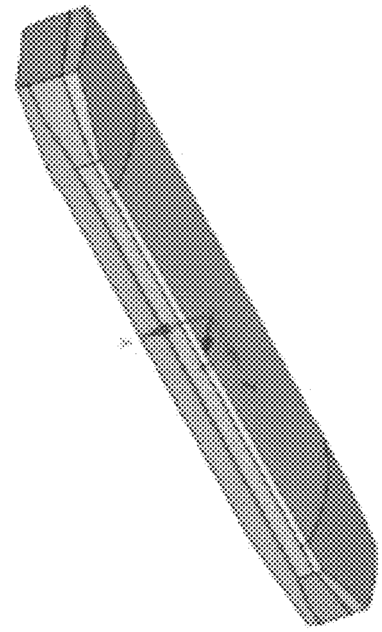
FIG. 5B is a simulated perspective view of the hazardous location LED light fixture assembly shown in FIG. 5A.

FIGS. 1-4 illustrate multiple views of an exemplary embodiment of a linear LED lighting fixture 10 specifically designed to meet the needs of a harsh and/or hazardous location. As shown in FIGS. 1, 3 and 4, an axial elongated enclosure 11 houses all components of the fixture 10. In a contemplated embodiment, the axial elongated enclosure 11 is constructed from sheet moulding composite (SMC) material to meet the harsh/hazardous location requirements. Alternative materials such as glass-reinforced plastic (GRP) or any type of fiber-reinforced plastic (FRP) or known heavy duty polymer material may also be used to fabricate the enclosure 11 as desired. The enclosure 11 may also be fabricated from a glass or carbon filled material having the strength needed for the harsh and/or hazardous location.

The fixture 10 further includes a first axially elongated linear LED module 12 mounted in the enclosure 11 and a second axially elongated linear LED module 13 mounted in the enclosure 11 that are spaced apart from one another and have a parallel relationship to one another. In the context of the present description, the "linear LED module" shall refer to a module having a plurality of LEDs arranged to coincide along a continuous line in a single module housing, as opposed to singular modules having a single LED or an LED module having LEDs that are not arranged to coincide along a single line. Each of the LED modules 12, 13 includes at least one axially elongated linear printed circuit board with light emitting diode (LED) components collectively mounted thereon. It is recognized, however, that such linear LED modules are not strictly required in all embodiments to realize at least some of the benefits described.

Each of the first LED module 12 and second LED module 13 have multiple LEDs 14 that are spaced apart from one another along a longitudinal axis of the modules 12, 13. While 34 LEDs are shown in the example of FIG. 1 in the combination of the first LED module 12 and the second LED module 13, this is a non-limiting example and greater or fewer number of LEDs may likewise be implemented. The first and second LED modules 12, 13 are both mounted directly to the enclosure 11, and importantly neither of the first and second LED modules 12, 13 are thermally coupled to a heat sink to dissipate the heat from the LEDs 14 in operation.

The fixture 10 further includes an LED driver module 15 that is mounted directly in the enclosure that operates the first and second LED modules 12, 13. The LED driver module 15 may be a printed circuit board (PCB) that may include integrated circuit (IC) chips, or any type of micr-controller configured to operate the LEDs accordingly. That is, the LED driver module 15 operates the at least one linear printed circuit board with light emitting diode components in each of the LED modules provided. In contemplated embodiments, an inverter module 1202 is placed or located adjacent to the LED driver module, and a battery pack 1204 may also be placed or located adjacent to the inverter module to provide emergency backup power when needed.

The LED driver module 15 is positioned laterally in the enclosure 11 at a location between the first LED module 12 and the second LED module 13. As seen more clearly in FIG. 2, the LED driver module 15 is also elevated relative to the first LED module and the second LED module 12, 13. The elevation and spacing of the LED driver module 15 from the LED modules 12, 13 in the vertical direction (FIG. 2) in combination with the spacing of the parallel first second LED modules 12, 13 and the LED drive module 15 in the horizontal direction (FIG. 1) allows for an effective dissipation of heat in operation of the fixture without requiring a heat sink at all. As such, neither the at least one elongated linear printed circuit board with LED components in the LED modules 12, 13 or the LED driver module 15 dissipate heat to a separately provided heat sink in the axially elongated enclosure 11.

To further improve dissipation of heat and overall thermal performance of the fixture, each of the first and second elongated printed circuit boards with LED components in each of the LED modules 12, 13 may be sealed with a polymer enclosure 102 such that the total air volume in the enclosure less than about 10 $cm^3$. It is contemplated, however, that the total air volume may be more or less in other embodiments while still providing acceptable thermal performance in use in a harsh and/or hazardous location.

The fixture 10 further includes a first set of terminals 16 at the end of one end of the first and second LED modules 12, 13 and a second set of terminals 17 at the opposing end of the first and second LED modules 12, 13. The first and second sets of terminals 16, 17 extend partly out of the enclosure 11 for electrical connection to a main power supply, via electrical cables, for the first and second LED modules 12, 13 to power the LEDs 14 as well as the LED driver module 15.

In addition to the sets of terminals 16, 17, the enclosure 11 has a first removable terminal cover 18 and a second removable terminal cover 19 cover attached to each end of the axially elongated enclosure that contains the wiring from the terminals to the other electrical components. The cable terminals and terminations are made in manner to meet the requirements for hazardous location use. Cable termination covers and enclosures are likewise fabricated from materials to meet the requirements for hazardous location use.

The fixture 10 further includes a lens 20 covering the portion of the fixture 10 not covered by either the enclosure 11 or the first and second terminal covers 16, 17. The lens 20 extends between the terminal covers 18, 19 and covers the bottom portion of the fixture with the first and second LED modules 12, 13 arranged to properly illuminate and diffuse light to an area in a hazardous location. The lens 20 shown in this embodiment is clear and made of polymer material such as polycarbonate (PC) or polyamide material, including but not necessarily limited to polycarbonate glass or a polyamide glass material. The lens material is chosen to be lightweight, corrosion resistant, non-flammable, and resistant to exposure to high temperatures. The polymer cover lens material may also have a transparency that is greater than about 80%. In other embodiments, however, alternative materials having greater or less transparency may be used to fabricate the lens as desired.

FIGS. 5A through 11B illustrate multiple simulated views of the LED lighting fixture shown and described in relation to FIGS. 1-4, and simulations to test thermal performance in different use cases for comparative assessment to conventional LED lighting fixtures for harsh and hazardous locations that conventionally employ heat sinks for thermal management purposes. The simulation analysis shown was conducted using Ansys Inc. Thermal Analysis software, version 19.1.

In the simulations tested, the steady state maximum allowable temperature for the entire linear LED light fixture was 55° C. The steady state maximum allowable temperature for the LED casing was 105° C. and 90° C. for the LED driver module. Due to the high number of individual components in the assembly only surface temperature was simulated. Further, the driver components were not modeled in the simulation, and the entire driver was modeled as a lump mass. For the modeling of conventional LED fixtures including heat sinks, a thin thermal pad and gasket commonly employed with heat sinks were not modelled in detail in the simulations considered.

Assumptions were also made for the sake of keeping the simulation not overly complex. The first assumption was a constant thermal conductivity for solids as opposed to the true relationship between thermal conductivity of metal and temperature where conductivity decreases with temperature. The basis of this assumption was that there are no significant variations in conductivity in the 40° C.-80° C. range. The second assumption was neglecting thermal contact resistance between adjacent parts. The basis of this assumption was on thermal analysis of similar products known in the art. The third assumption, as previously described, was modeling the LED driver as a lump mass. The thermal conductivities of LED drivers are unknown and no test data was currently available. The basis of this assumption was that internal component temperatures are not important, and only outer surface temperature was the area of concern. The fourth assumption made was that the PCB thermal conductivity in the plane direction was assumed and this assumption was based off similar products.

The types of materials chosen for the parts of the linear LED light fixture plays a role in dictating how much overlapping occurs in the heat dissipation. Different types of materials with different properties for numerous parts of the fixture were tested and are shown below in the following table:

TABLE 1

| Material Name | Where Used | Thermal Conductivity (W/m-K) | Emissivity |
|---|---|---|---|
| Lexan resin (Polycarbonate) | Internal lens | 0.2 | 0.8 |
| CCH J 119 (Polycarbonate) | Covers | 0.2 | 0.8 |
| Polyester resin | Body | 0.2 | 0.8 |
| Driver lump body | Driver | 1.6 | 0.8 |
| Al 6061 | Heat sink | 167 | 0.8 |
| PCB | PCB | In plane: 130<br>Perpendicular: 1.5 | 0.8 |
| Thermal grease | Thermal grease | 2.5 | |

The first thermal performance simulation was made at a 21 W operating heat load for the fixture. The heat generation for the first simulation is shown in Table 2:

TABLE 2

| Ambient temperature = 55° C.<br>Heat Generation | |
|---|---|
| Component Name | Heat generation (W) |
| LEDs | 15.8 for 24 LEDs<br>(0.65 for one LED) |
| Driver heat load | 5.3 |
| Total | 21.1 |

Figure 6:
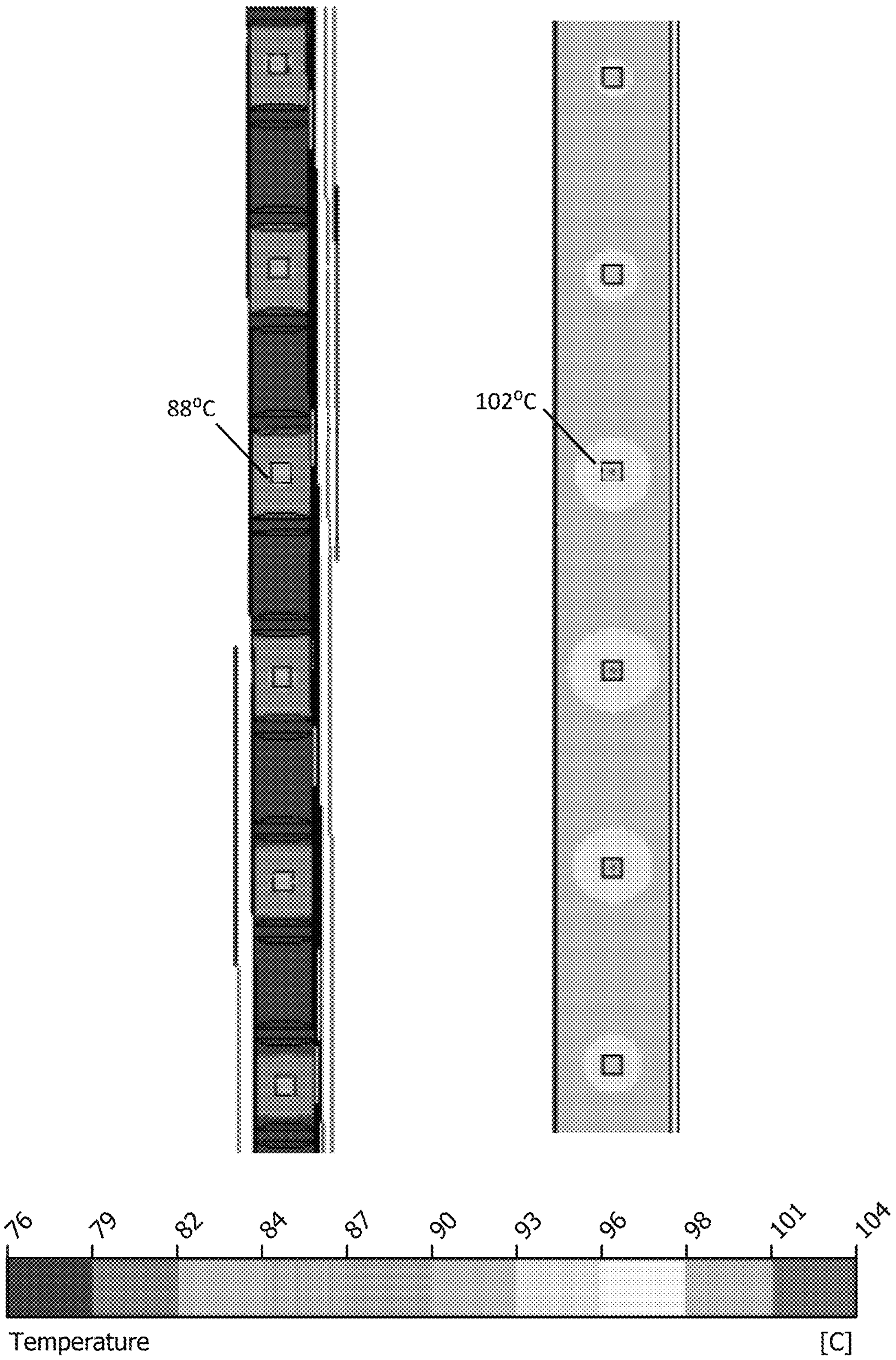
FIG. 6 is a comparative simulated thermal image of an LED module in the hazardous location LED light fixture assembly shown in FIGS. 5A through 5C when subjected to an operating 21 W heat load and without dissipating heat to a heat sink

FIG. 6 illustrates the simulated temperature of the LED module utilized in the fixture with and without the heat sink for the 21 W operating heat load. As seen in FIG. 6, the peak temperature for the LED module with the heat sink was 88° C. and the peak temperature for the LED module without the heat sink was 102° C. As such, the fixture design without the heat sink had a 14° C. higher temperature at the LEDs, but the temperature increase remains within acceptable limits for typical harsh and/or hazardous location use. Specifically, in a contemplated hazardous location, a peak temperature adjacent at least one of the first elongated LED module and the second elongated LED module may be approximately 110° C. or less when the light fixture operates with a heat load of 21 W or less, without presenting an ignition concern in the hazardous location and while providing some safety margin relative to higher temperatures that would raise ignition concerns.

Figure 7A:
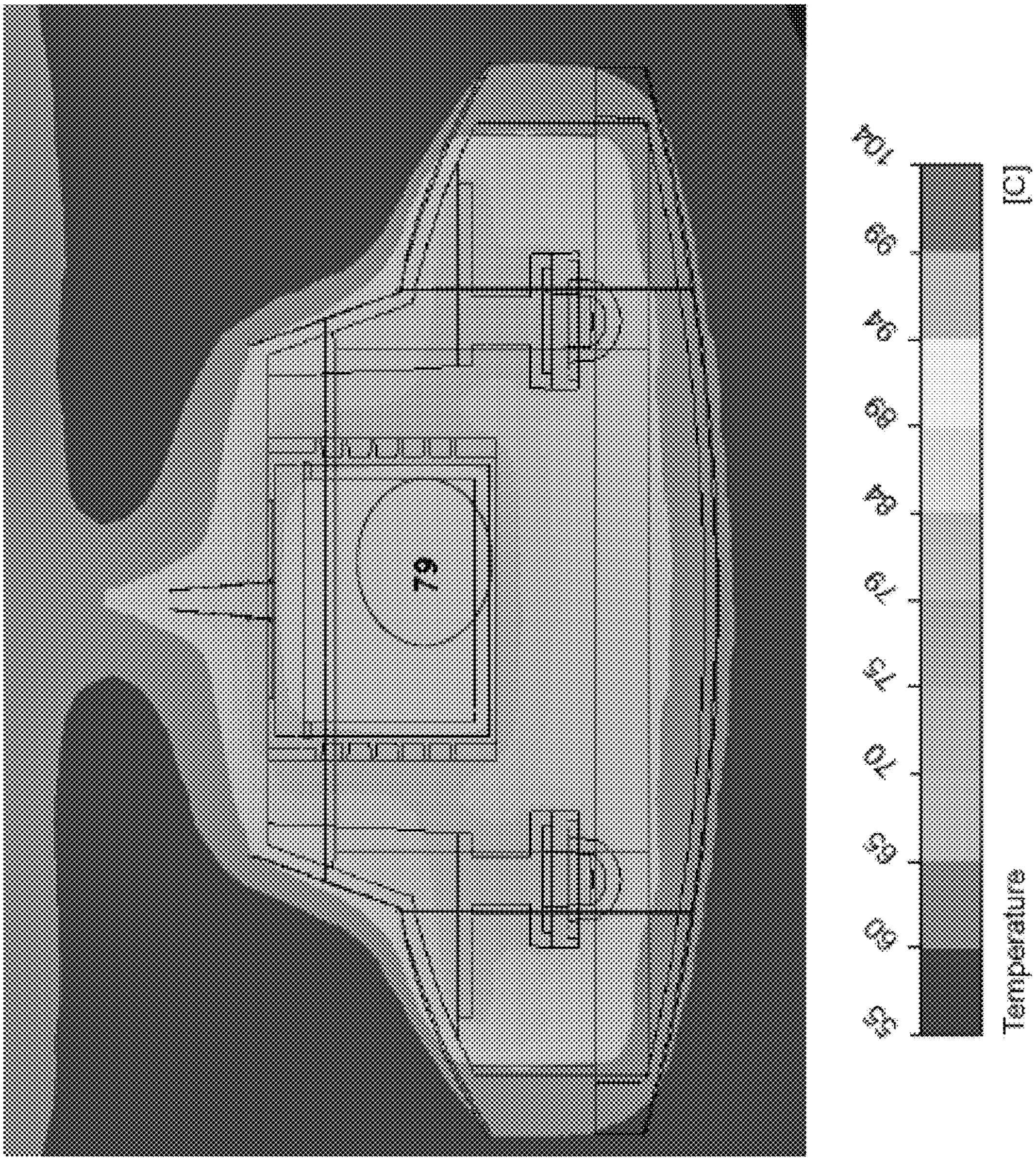
FIG. 7A is a first sectional simulated thermal image of the hazardous location LED light fixture assembly shown in FIGS. 5A through 5C when subjected to an operating 21 W heat load and while dissipating heat to heat sinks in the assembly.
Figure 7B:
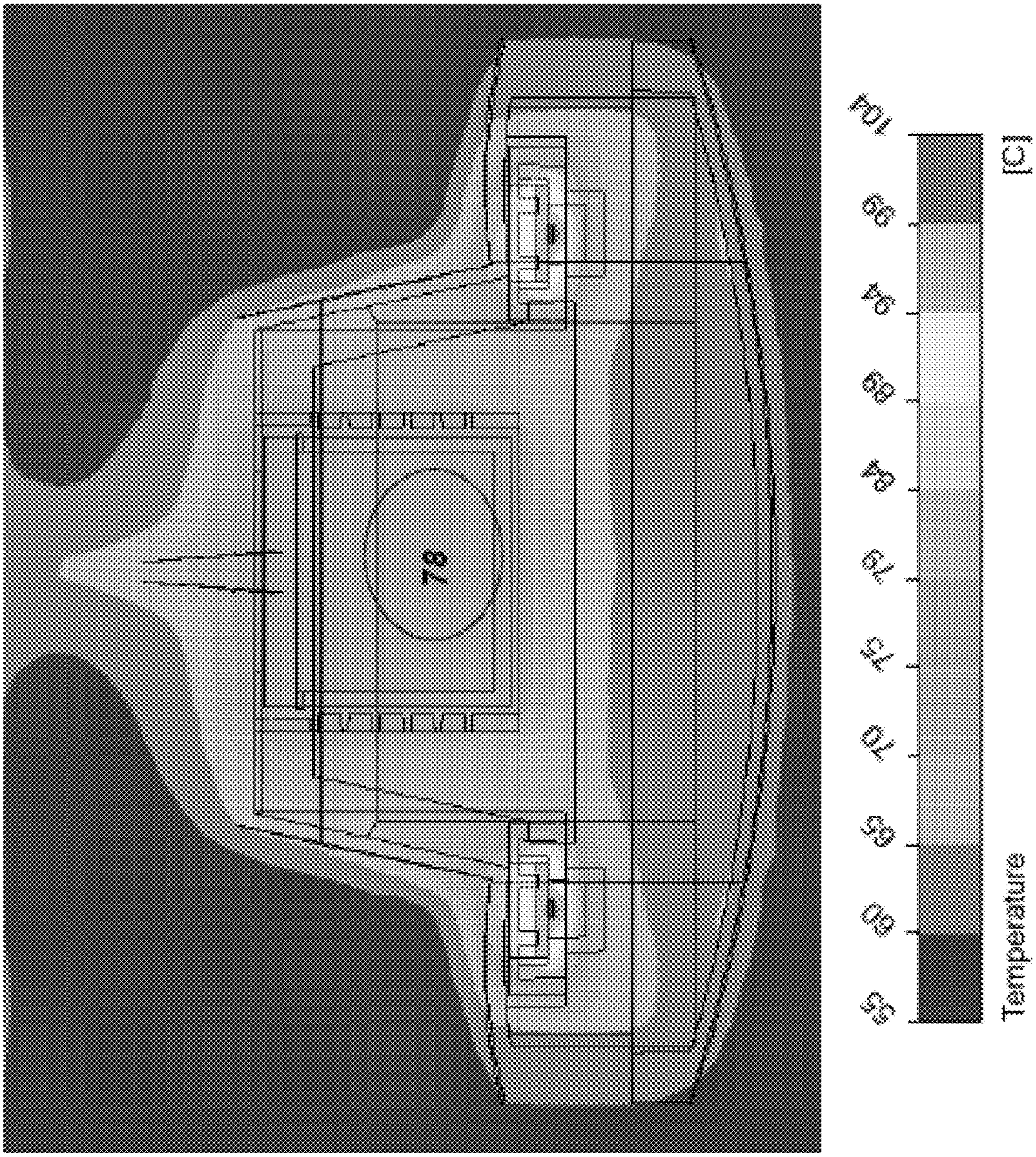
FIG. 7B is a second sectional simulated thermal image of the hazardous location LED light fixture assembly shown in FIGS. 5A through 5C when subjected to an operating 21 W heat load and without dissipating heat to heat sinks.

FIGS. 7A and 7B show temperature profiles of the LED driver as well as both LED drive modules with and without heat sinks. FIG. 7A illustrates the simulated fixture with a heat sink and the driver temperature is indicated as 79° C. FIG. 7B illustrates a simulated fixture without a heat sink and the driver temperature is indicated as 78° C. The LED driver temperatures in both scenarios are practically identical, and the simulated temperatures are well within acceptable limits for typical hazardous location use. Specifically, in a contemplated hazardous location use, a peak temperature adjacent at least one of the first elongated LED driver module may be approximately 80° C. or less when the light fixture operates with a heat load of 21 W or less, without presenting an ignition concern in the hazardous location and while providing some safety margin relative to higher temperatures that would raise ignition concerns.

Figure 8A:
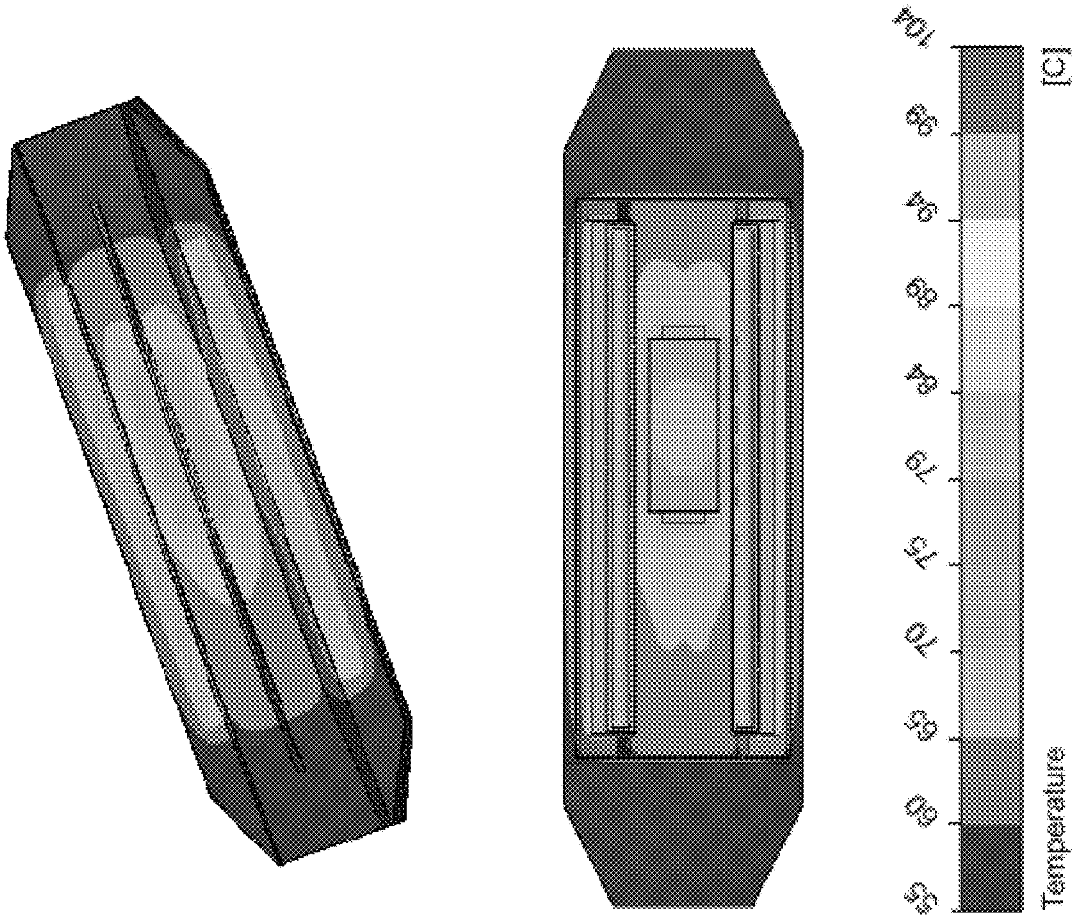
FIG. 8A shows a first top and bottom simulated thermal image of the hazardous location LED light fixture assembly shown in FIGS. 5A through 5C when subjected to an operating 21 W heat load and while dissipating heat to heat sinks.
Figure 8B:
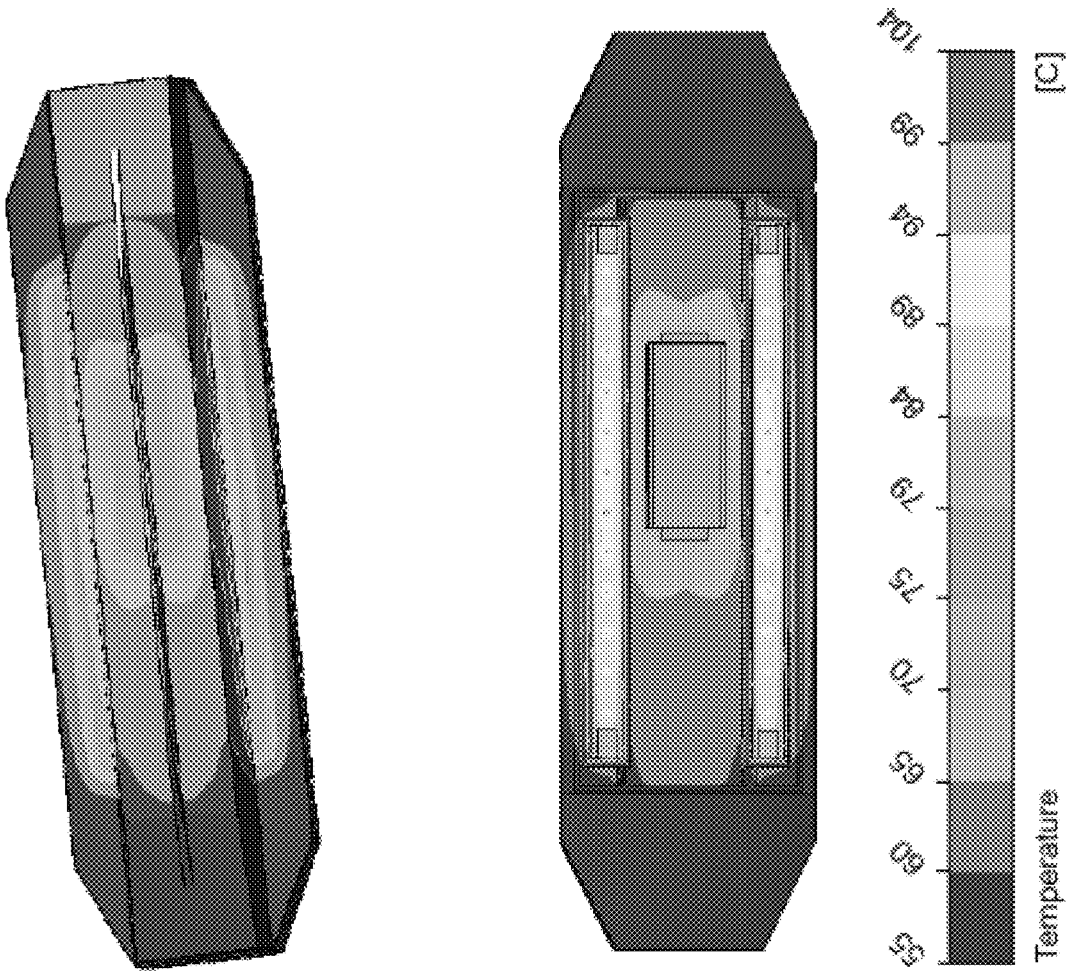
FIG. 8B shows a second top and bottom simulated thermal image of the hazardous location LED light fixture assembly shown in FIGS. 5A through 5C when subjected to an operating 21 W heat load and without dissipating heat to heat sinks.

FIGS. 8A and 8B illustrate the temperature profile of the top and bottom of the fixture which include axially elongated enclosure, lens, and terminal covers for a simulated fixture with a heat sink and without a heat sink respectively.

While differences in the temperature profiles exist, they are well within acceptable limits for typical hazardous location use, such that the costs and assembly complications of conventional heat sinks are not necessarily required to manage temperatures to acceptable levels for harsh and/or hazardous location use.

A second set of simulation tests were made at an operating heat load of 16.5 W for the fixture. The heat generation for the second simulation is shown in Table 3:

TABLE 3

| Ambient temperature = 55° C. Heat Generation | |
|---|---|
| Component Name | Heat generation (W) |
| LEDs | 11 for 24 LEDs (0.45 for one LED) |
| Driver heat load | 5.3 |
| Total | 16.3 |

Figure 9:
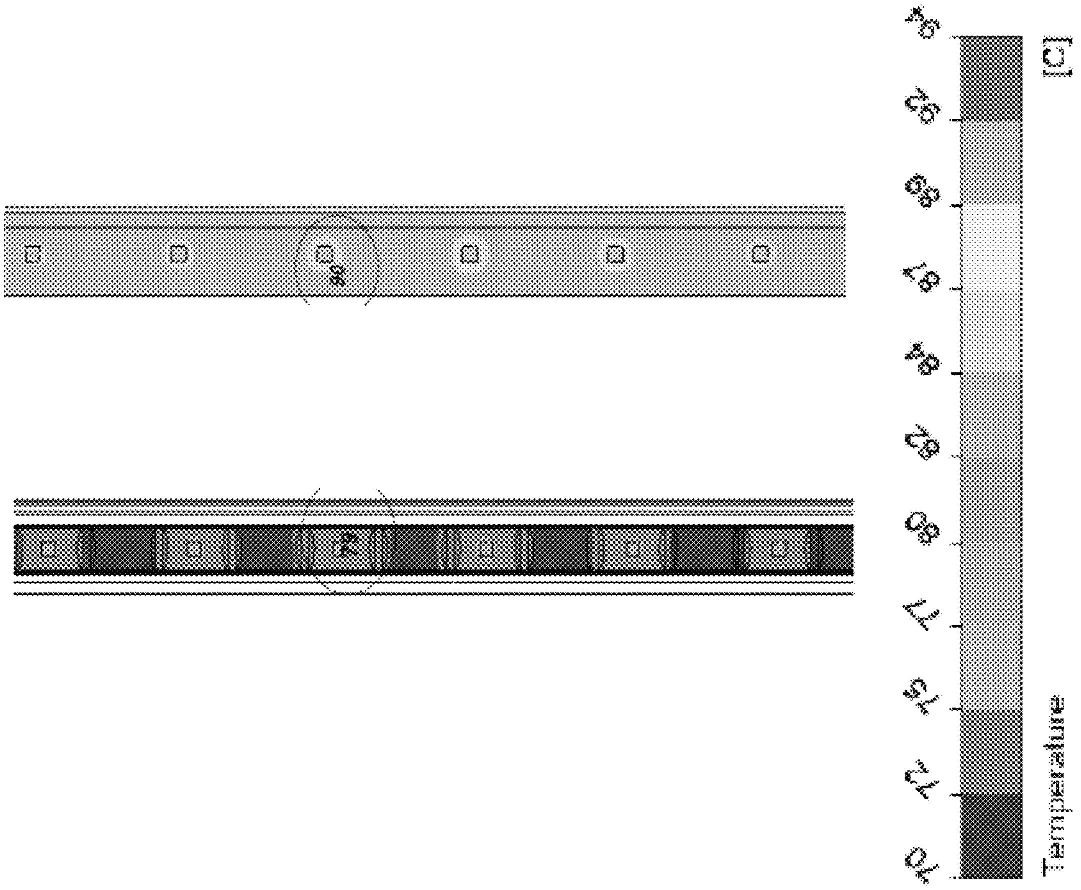
FIG. 9 is a comparative simulated thermal image of an LED module in the hazardous location LED light fixture assembly shown in FIGS. 5A through 5C when subjected to an operating 16.5 W heat load with and without dissipating heat to heat sinks.

FIG. 9 illustrates the temperature contour with and without the heat sink at the operating heat load of 16.5 W. In FIG. 9, the temperature for the LED module with the heat sink was 79° C. and the temperature for the LED module without the heat sink was 90° C. As such, the design without the heat sink has an 11° C. higher temperature at the LEDs but well within acceptable limits for typical harsh and hazardous location use.

Figure 10A:
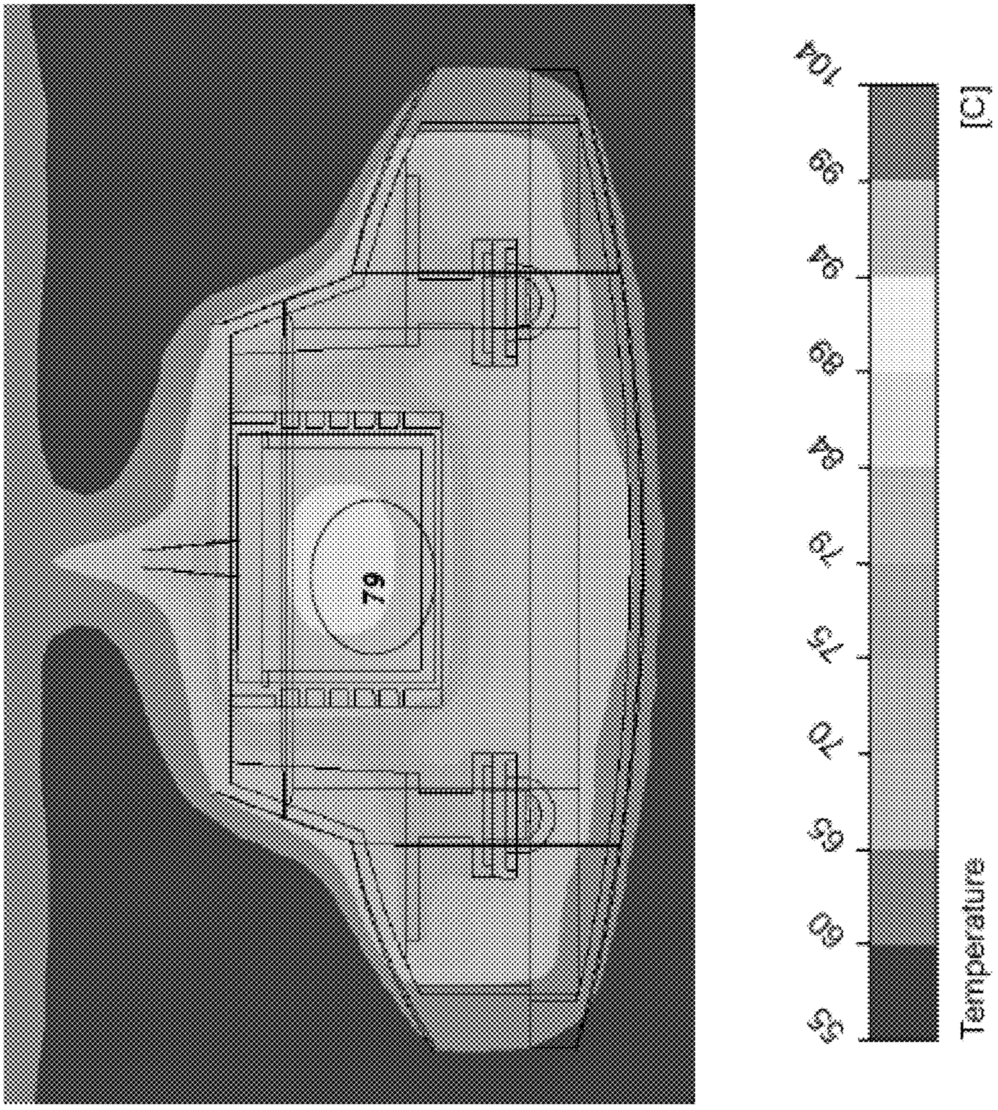
FIG. 10A is a first sectional simulated thermal image of the hazardous location LED light fixture assembly shown in FIGS. 5A through 5C when subjected to an operating 16.5 W heat load and while dissipating heat to heat sinks in the assembly.
Figure 10B:
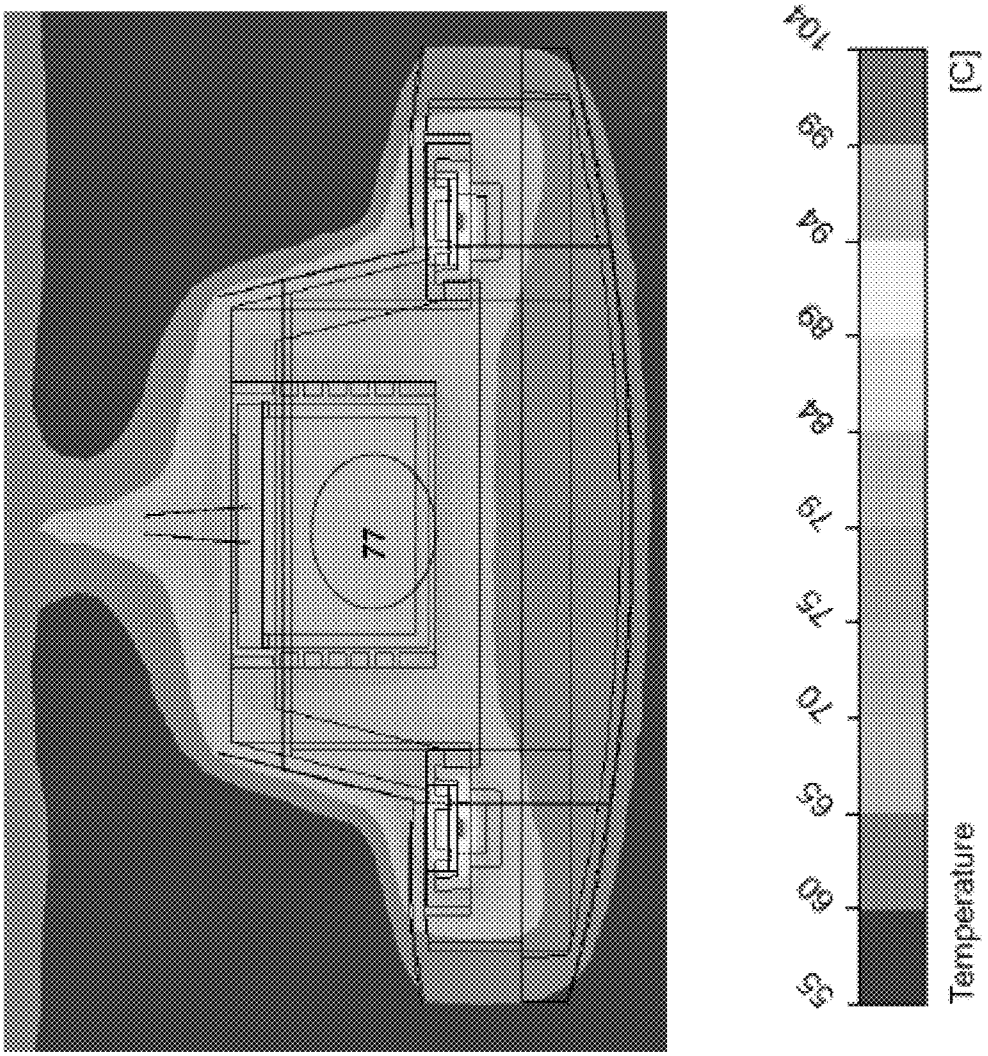
FIG. 10B is a second sectional simulated thermal image of the hazardous location LED light fixture assembly shown in FIGS. 5A through 5C when subjected to an operating 16.5 W heat load and without dissipating heat to heat sinks.

FIGS. 10A and 10B illustrate the temperature profile of a side cross sectional view of the simulated fixture at the operating heat load of 16.5 W. FIG. 10A illustrates the simulated fixture with a heat sink and the driver temperature is indicated as 79° C. FIG. 10B shows a simulated fixture without a heat sink and the driver temperature is indicated as 77° C. The LED driver temperatures in both scenarios are practically identical, and the simulated temperatures are well within acceptable limits for typical harsh and hazardous location use.

Figure 11A:
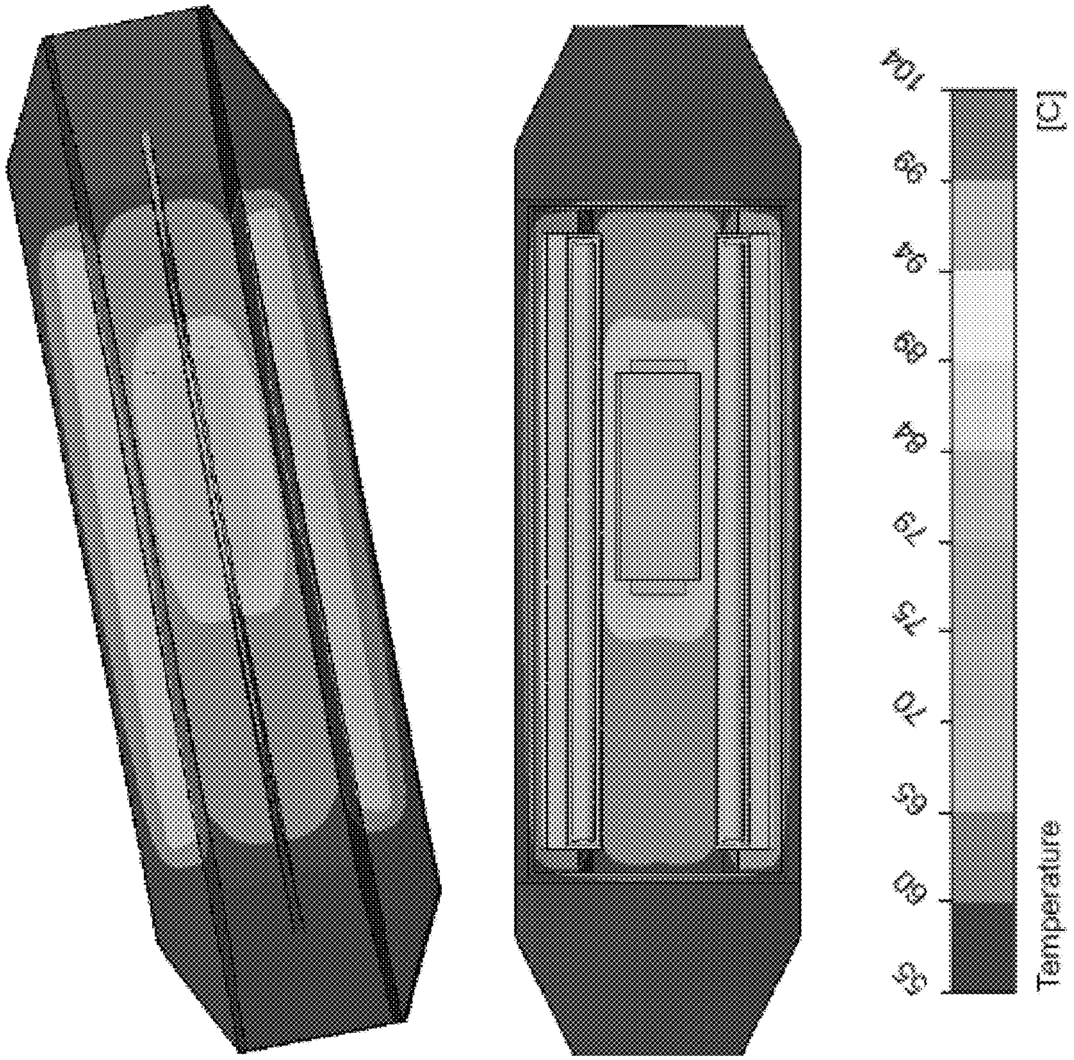
FIG. 11A shows a first top and bottom simulated thermal image of the hazardous location LED light fixture assembly shown in FIGS. 5A through 5C when subjected to an operating 16.5 W heat load and while and dissipating heat to heat sinks.
Figure 11B:
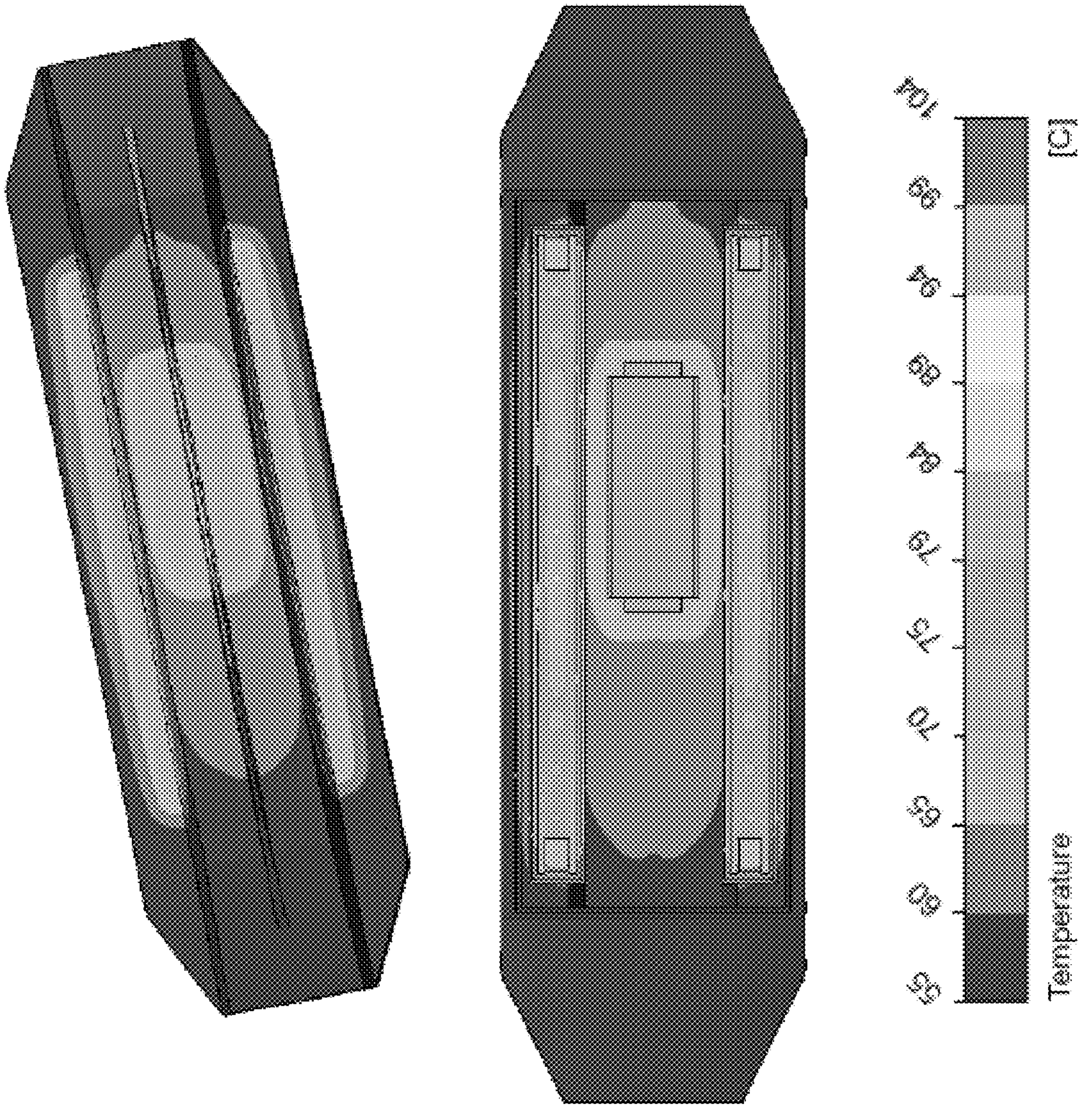
FIG. 11B shows a second top and bottom simulated thermal image of the hazardous location LED light fixture assembly shown in FIGS. 5A through 5C when subjected to an operating 16.5 W heat load and without dissipating heat to heat sinks.
Figure 12:
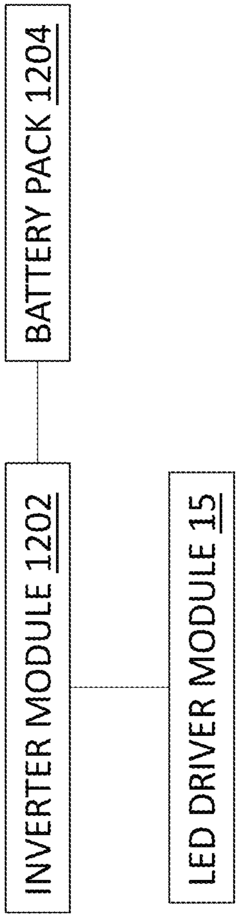
FIG. 12 is a schematic diagram of an LED driver module of the LED light fixture shown in FIG. 1.

FIGS. 11A and 11B illustrate the temperature profile of the top and bottom of the fixture which include axially elongated enclosure, lens, and terminal covers for a simulated fixture with a heat sink and without a heat sink respectively. While differences in the temperature profiles exist, they are well within acceptable limits for typical harsh and hazardous location use, such that the costs and assembly complications of conventional heat sinks are not necessarily required to manage temperatures to acceptable levels for hazardous location use.

Although in both sets of thermal performance simulations at 21 W and 16.5 W heat loads, more heat is dissipated using a heat sink in contrast to not using a heat sink, the temperature differences when observing the critical components of the LED modules and the LED driver are not significantly different. The target temperature limit/threshold to stay beneath for the LED casing was 105° C. and 90° C. respectively to safely satisfy the needs for hazardous location usage. In both simulations for the 21 W and 16.5 W heat loads, the simulated temperatures for the LED modules and LED driver module were each beneath these target temperature thresholds or limits needed for harsh/hazardous location use.

The thermal simulations therefore provide proof of concept that heat sinks are not necessarily required to meet the thermal management needs of harsh/hazardous location LED lighting fixtures, and instead via the novel arrangement and spacing of the heat generating components in the fixture as described in relation to FIGS. 1-4, as well as the materials utilized in the assembly of the fixture, may provide acceptable thermal performance in a lower cost assembly with simplified manufacture.

The benefits and advantages of the inventive concepts are now believed to have been demonstrated in the exemplary embodiments disclosed.

An embodiment of a light fixture for a hazardous location has been disclosed. The light fixture includes an axially elongated enclosure fabricated from a glassfiber reinforced plastic material, at least one axially elongated linear light emitting diode (LED) module mounted in the enclosure, and an LED driver module mounted in the axially elongated enclosure and operating the at least one linear light emitting diode. Neither the at least one elongated linear LED module or the LED driver module dissipates heat to a separately provided heat sink in the axially elongated enclosure, and the LED driver module and the at least one axially elongated linear LED module are operable within a target peak temperature limit for the hazardous location.

Optionally, the at least one elongated LED module may include a first elongated LED module and a second elongated LED module extending in a spaced apart but generally parallel relationship to one another. The LED driver module may be positioned laterally in the enclosure at a location between the first elongated LED module and the second elongated LED module. A peak temperature adjacent at least one of the first elongated LED module and the second elongated LED module may be approximately 110° C. or less when the light fixture operates with a heat load of 21 W or less. Also, a peak surface temperature adjacent the LED driver module is approximately 80° C. or less when the light fixture operates with a heat load of 21 W or less. The LED driver module may be elevated relative to the first elongated LED module and the second elongated LED module.

The light fixture may also include a first set of terminals at one end of the first elongated LED module and the second elongated LED module, and a second set of terminals at an opposing end of the first elongated LED module and the second elongated LED module. First and second removable terminal covers may be attached to each end of the axially elongated enclosure. A polycarbonate lens may extend between the first and second removable terminal covers.

The elongated enclosure of the fixture may be fabricated from sheet moulding composite material. Each of the first elongated LED module and the second elongated LED module includes thirty four LEDs.

Another embodiment of a light fixture for a harsh and hazardous location has been disclosed. The light fixture includes an axially elongated enclosure fabricated from a polymer material, at least one axially elongated linear printed circuit board with light emitting diode (LED) components mounted in the enclosure, and an LED driver module mounted in the housing and operating the at least one linear printed circuit board with light emitting diode components, wherein neither the at least one elongated linear printed circuit board with LED components or the LED driver module dissipate heat to a separately provided heat sink in the axially elongated enclosure, and wherein the LED driver module and the at least one axially elongated linear printed circuit boards with LED components are operable within a target peak temperature limit for the hazardous location.

Optionally, the axially elongated enclosure polymer material may be a glass or carbon filled material. The axially elongated enclosure may include a first elongated printed circuit board with LED components and a second elongated printed circuit board with LED components extending in a spaced apart but generally parallel relationship to one another. Each of the first and second elongated printed circuit boards with LED components may be sealed with a polymer enclosure such that the total air volume in the enclosure less than 10 $cm^3$. The LED driver module may be positioned laterally in the axially elongated enclosure at a location between the first elongated printed circuit board with LED components and the second elongated printed circuit board with LED components. An inverter module may be placed adjacent to the LED driver module, and a battery pack may be placed adjacent to the inverter module. The LED driver module may be elevated relative to the first elongated printed circuit board with LED components and the second elongated printed circuit board with LED components.

A first set of terminals may be provided at one end of the first elongated printed circuit board with LED components and the second elongated printed circuit board with LED components, and a second set of terminals at an opposing end of the first elongated printed circuit board with LED components and the second elongated printed circuit board with LED components. First and second removable terminal covers may be attached to each end of the axially elongated enclosure. A polymer cover lens may extend between the first and second removable terminal covers. The polymer cover lens material may be a polycarbonate glass or a polyamide glass. The polymer cover lens material may have a transparency that is greater than 80%. The elongated enclosure may be fabricated from sheet moulding composite material.

Another embodiment of a light fixture for a harsh and hazardous location has also been disclosed. The light fixture includes an axially elongated enclosure fabricated from a polymer material, at least one axially elongated linear printed circuit board with light emitting diode (LED) components mounted in the enclosure, and an LED driver module mounted in the housing and operating the at least one linear printed circuit board with light emitting diode component. The at least one elongated linear printed circuit board with LED components does not dissipate heat to a separately provided heat sink in the axially elongated enclosure, and the LED driver module and the at least one axially elongated linear printed circuit board with LED components are operable within a target peak temperature limit for the harsh and hazardous location.

Optionally, the axially elongated enclosure polymer material may be a glass or carbon filled material. The axially elongated enclosure may include a first elongated printed circuit board with LED components and a second elongated printed circuit board with LED components extending in a spaced apart but generally parallel relationship to one another. Each of the elongated printed circuit boards with LED components may be sealed with a polymer enclosure such that the total air volume in the enclosure is less than 10 $cm^3$. The LED driver module may be positioned laterally in the enclosure at a location between the first elongated printed circuit board with LED components and the second elongated printed circuit board with LED components. An inverter module may be placed adjacent to the LED driver module, and a battery pack may be placed adjacent to the Invertor module. The LED driver module may be elevated relative to the first elongated printed circuit board with LED components and the second elongated printed circuit board with LED components.

A first set of terminals may be provided at one end of the first elongated printed circuit board with LED components and the second elongated printed circuit board with LED components, and a second set of terminals at an opposing end of the first elongated printed circuit board with LED components and the second elongated printed circuit board with LED components. First and second removable terminal covers may be attached to each end of the axially elongated enclosure. A polymer cover lens may extend between the first and second removable terminal covers. The polymer cover lens material may be a polycarbonate glass or polyamide glass, and may have a transparency of less than 80%. The elongated enclosure may be fabricated from sheet moulding composite material.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A light fixture for a harsh and hazardous location, the light fixture comprising:

an axially elongated enclosure fabricated from a polymer material;

at least one axially elongated linear printed circuit board with light emitting diode (LED) components mounted in the axially elongated enclosure;

an LED driver module mounted in the axially elongated enclosure and operating the at least one axially elongated linear printed circuit board with LED components; and a cover lens separately provided from the axially elongated enclosure and covering a portion of the light fixture opposite the axially elongated enclosure, wherein a combination of a cover lens material of the cover lens and the polymer material of the axially elongated enclosure assists with heat dissipation from the light fixture, thereby allowing the LED driver module and the at least one axially elongated linear printed circuit board with LED components to operate within a target peak temperature limit for the hazardous location.

2. The light fixture of claim 1, wherein the axially elongated enclosure polymer material is a glass or carbon filled material.

3. The light fixture of claim 1, wherein the axially elongated enclosure includes a first elongated printed circuit board with LED components and a second axially elongated printed circuit board with LED components extending in a spaced apart but generally parallel relationship to one another.

4. The light fixture of claim 3, wherein each of the first and second axially elongated printed circuit boards with LED components is separately sealed with a polymer enclosure such that a total air volume in the polymer enclosure is less than 10 $cm^3$.

5. The light fixture of claim 3, wherein the LED driver module is positioned laterally in the axially elongated enclosure at a location between the first elongated printed circuit board with LED components and the second axially elongated printed circuit board with LED components, the LED driver module positioned away from ends of the axially elongated enclosure.

6. The light fixture of claim 5, wherein an inverter module is placed adjacent to the LED driver module.

7. The light fixture of claim 6, wherein a battery pack is placed adjacent to the inverter module.

8. The light fixture of claim 5, wherein the LED driver module is elevated relative to the first axially elongated printed circuit board with LED components and the axially second elongated printed circuit board with LED components.

9. The light fixture of claim 5, further comprising a first set of terminals at one end of the first axially elongated printed circuit board with LED components and the second axially elongated printed circuit board with LED components, and a second set of terminals at an opposing end of the first axially elongated printed circuit board with LED components and the second axially elongated printed circuit board with LED components.

10. The light fixture of claim 9, further comprising first and second removable terminal covers attached to each end of the axially elongated enclosure.

11. The light fixture of claim 10, wherein the cover lens is a polymer cover lens extending between the first and second removable terminal covers.

12. The light fixture of claim 1, wherein the elongated enclosure is fabricated from sheet moulding composite material.

13. The light fixture of claim 1, wherein neither the at least one axially elongated linear printed circuit board with LED components nor the LED driver module dissipate heat to a separately provided heat sink in the axially elongated enclosure.

14. The light fixture of claim 1, wherein the cover lens material is a glass or carbon filled material.

15. The light fixture of claim 1, wherein the combination of the cover lens material of the cover lens and the polymer material of the axially elongated enclosure provides a threshold level of corrosion resistance, thereby allowing the LED driver module and the at least one axially elongated linear printed circuit board with LED components to operate within the hazardous location comprising one or more corrosive elements.

16. The light fixture of claim 1, wherein the target peak temperature limit is based on a heat load of the light fixture.

17. The light fixture of claim 1, wherein a peak surface temperature adjacent the LED driver module is less than a threshold peak surface temperature.

18. The light fixture of claim 17, wherein the peak surface temperature adjacent the LED driver module is based on a heat load of the light fixture.

19. The light fixture of claim 1, wherein the LED driver module and the at least one axially elongated linear printed circuit board with LED components are operable within the target peak temperature limit for the hazardous location.

20. The light fixture of claim 1, wherein the at least one axially elongated linear printed circuit board with LED components does not dissipate heat to a separately provided heat sink in the axially elongated enclosure.

* * * * *